United States Patent

Modglin

(10) Patent No.: US 8,136,289 B2
(45) Date of Patent: Mar. 20, 2012

(54) AUTOMATIC JIGGING ACTUATOR FOR A FISHING ROD

(76) Inventor: Herbert A. Modglin, Scott City, MO (US)

( * ) Notice: Subject to any disclaimer, the term of this patent is extended or adjusted under 35 U.S.C. 154(b) by 1883 days.

(21) Appl. No.: 10/919,079

(22) Filed: Aug. 16, 2004

(65) Prior Publication Data

US 2006/0032105 A1  Feb. 16, 2006

(51) Int. Cl.
  *A01K 97/10*  (2006.01)
  *A01K 91/06*  (2006.01)
(52) U.S. Cl. .......................... 43/19.2; 43/26.1
(58) Field of Classification Search ............... 43/19.2, 43/26.1
  See application file for complete search history.

(56) References Cited

U.S. PATENT DOCUMENTS

| | | | |
|---|---|---|---|
| 3,001,317 A | 9/1961 | Boughton | |
| 3,031,790 A | 5/1962 | Duryea | |
| 3,550,302 A | 12/1970 | Creviston et al. | |
| 3,619,668 A | 11/1971 | Pinckaers | |
| 3,691,668 A * | 9/1972 | Strebig | 43/19.2 |
| 3,789,534 A | 2/1974 | Yankaitis | |
| 3,839,810 A * | 10/1974 | Lagasse | 43/19.2 |
| 4,020,582 A | 5/1977 | Theien | |
| 4,197,668 A | 4/1980 | McKinsey | |
| 4,280,295 A | 7/1981 | Hoeving et al. | |
| 4,420,900 A | 12/1983 | Nestor | |
| 4,528,767 A | 7/1985 | Smith, Jr. | |
| 4,597,215 A | 7/1986 | Otremba | |
| 4,660,317 A | 4/1987 | Evans | |
| 4,680,885 A | 7/1987 | Lindell | |
| 4,700,501 A | 10/1987 | Bryan | |
| 4,811,514 A | 3/1989 | Jordan | |
| 4,821,448 A | 4/1989 | Lindaberry | |
| 5,036,616 A | 8/1991 | Wilsey | |
| 5,056,255 A * | 10/1991 | Campbell | 43/19.2 |
| 5,119,580 A * | 6/1992 | Schulte et al. | 43/19.2 |
| 5,201,884 A | 4/1993 | Nicholas | |
| 5,437,121 A * | 8/1995 | Chacon et al. | 43/19.2 |
| 5,473,835 A | 12/1995 | Emett | |
| 5,540,010 A * | 7/1996 | Aragona | 43/19.2 |
| 5,570,534 A * | 11/1996 | Ford | 43/19.2 |
| 5,638,628 A * | 6/1997 | Davis | 43/4.5 |
| 6,009,656 A * | 1/2000 | Knepp | 43/26.1 |
| 6,282,830 B1 | 9/2001 | Henry | |
| 6,363,650 B1 | 4/2002 | Beeler | |
| 6,401,380 B1 * | 6/2002 | McGonigal, Jr. | 43/19.2 |
| 6,415,543 B2 * | 7/2002 | Keller | 43/19.2 |
| 6,588,137 B1 | 7/2003 | Rozkowski | |
| 6,634,134 B1 | 10/2003 | Nuquist | |
| 6,772,078 B2 | 4/2004 | Kelley | |
| 6,779,291 B2 | 8/2004 | Arcand | |

* cited by examiner

FOREIGN PATENT DOCUMENTS

FR  2608371  6/1988

*Primary Examiner* — Darren W Ark
(74) *Attorney, Agent, or Firm* — Hovey Williams LLP

(57) ABSTRACT

An automatic jigging device (10) used to support to a fishing pole (12) and impart action to a fishing lure secured to the pole (12) broadly comprises a frame (22), an arm (24) rotatably secured to the frame (22), a fishing pole holder receiver (26) rigidly secured to the arm (24) and designed to accept a fishing pole holder (28) to support the pole (12), and an actuator (30) for selectively rotating the arm (24) with respect to the frame (22), thereby imparting action to the pole (12) and the lure. The frame (22) is designed to be rigidly secured to a support (32), such as a rail of a boat or a pier. The device (10) may also include a spring (50) to dampen the arm's (24) movement and a housing (46) to enclose and protect the arm (24), the actuator (30), and the spring (50).

20 Claims, 2 Drawing Sheets

AUTOMATIC JIGGING ACTUATOR FOR A FISHING ROD

BACKGROUND OF THE INVENTION

1. Field of the Invention

The present invention relates to fishing devices. More particularly, the present invention relates to an automatic jigging device that may be selectively secured to a boat or pier and operatively coupled with a fishing pole in order to impart action to a lure attached to the fishing pole, without otherwise interfering with operation of the fishing pole.

2. Description of Prior Art

Fishermen are more successful in catching fish when their lures realistically imitate live bait and/or other things that may induce a fish to strike. Fishermen therefore not only choose lures that look like live bait, but also want lures to imitate or move like live bait. In order to achieve this, some fishermen jerk their fishing poles in an effort to make their lures imitate live bait. However, such techniques may be difficult and beyond the skill of and/or may quickly fatigue many fishermen. Such techniques also require constant attention and repetitive motion, thereby reducing the recreational value of fishing.

In response, many devices have been developed that agitate fishing poles and/or lines for fishermen. However, prior art devices interfere with operation of the fishing pole to which they are attached. For example, many prior art devices mate with a handle or rod of a fishing pole in such a way as that they interfere with a fisherman's grip and operation of the fishing pole. Alternatively, some prior art devices attach directly to a line of a fishing pole, and therefore interfere with reeling in the line. In either case, setting a hook first requires a fisherman to extract his or her fishing pole from these prior art devices, which is often difficult.

Prior art devices are also often bulky, complex, and inefficient. For example, some prior art devices are rather large and must be permanently mounted to a fishing boat or other support and other include many moving parts. More energy is required to operate such complex devices, thereby making them inefficient.

Accordingly, there is a need for an improved automatic jigging device that overcomes the limitations of the prior art.

SUMMARY OF THE INVENTION

The present invention overcomes the above-identified problems and provides a distinct advance in the art of fishing devices. More particularly, the present invention provides an automatic jigging device that may be selectively secured to a boat or pier and operatively coupled with a fishing pole in order to impart action to a lure attached to the fishing pole, without otherwise interfering with operation of the fishing pole. The jigging device is designed to impart action to a fishing lure through a substantially conventional fishing pole. The jigging device broadly comprises a frame, an arm rotatably secured to the frame, and an actuator for selectively rotating the arm with respect to the frame, thereby imparting action to the fishing pole and the lure. The device also preferably includes a housing to enclose and protect the arm and the actuator. The frame is designed to be selectively but rigidly secured to a support, such as a rail of a boat or a pier, and is preferably secured to the arm through a pivot pin or axle.

The arm preferably includes a substantially horizontal member and a first and second flange, which preferably extend generally downwardly from the horizontal member. A fishing pole holder receiver preferably extends generally upward from the horizontal member near the pivot pin, thereby maximizing the actuator's leverage, and accepts a substantially conventional fishing pole holder.

In the preferred embodiment, the actuator is an electrical solenoid and includes a reciprocating rod pivotally secured to the first flange of the arm. As the reciprocating rod reciprocates, the arm is rotated about the pivot pin, thereby rocking the fishing pole holder receiver and imparting action to the fishing pole and the lure. As discussed above, in order to enhance the actuator's torque, the first flange is preferably located approximately midway along the horizontal member of the arm, with the fishing pole holder receiver located nearer the pivot pin. In this manner, the actuator may effectively impart action to large fishing poles.

Conversely, the device may include a spring to dampen the arm's movement. Specifically, the spring is preferably connected between the second flange of the arm and the housing. As the second flange is preferably located opposite the pivot pin, the spring may effectively resist the actuator.

The spring may be secured to the housing through a threaded rod so that the spring's tension may be adjusted in order to compensate for different fishing poles. Specifically, the threaded rod preferably extends through the housing and a threaded thumb wheel external to the housing. Turning the thumb wheel clockwise pulls the threaded rod further through the housing, thereby increasing the spring's tension for use with smaller fishing poles. Conversely, turning the thumb wheel counter-clockwise allows the spring to pull the threaded rod further into the housing, thereby deceasing the spring's tension for use with larger fishing poles. In this manner, the device may be infinitely adjustable for use with virtually any fishing pole. It should also be noted that the spring's tension may be adjusted to account for any undesirable slack or play associated with the arm or the actuator.

The device also preferably includes a controller having one or more controls to control the actuator, and therethrough the lure, and a power input through which electrical power is accepted to power the controls and the actuator. The controls may include a power switch for selectively powering the actuator, an intensity control for selecting a desired magnitude or intensity of the action imparted to the lure, a delay control for selecting a delay period during which less or no action is imparted to the lure, and a duration control for selecting a duration during which significant action is imparted to the lure after the delay period has elapsed.

The power input preferably connects to a battery or another similarly convenient power source. For example, the battery is preferably a marine battery, such as those commonly used in fishing boats, and connects to the controller through a battery cable plugged into the power input.

In use, a user first secures the frame to the support and the fishing pole holder to the fishing pole holder receiver. The user then connects the power input to the power source. The user then casts the lure as he or she normally would and places the fishing pole into the fishing pole holder. Using the controls, the user configures the controller as desired. When a fish strikes, the user may simply snatch the fishing pole from the fishing pole holder, thereby setting his or her hook in one swift motion.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
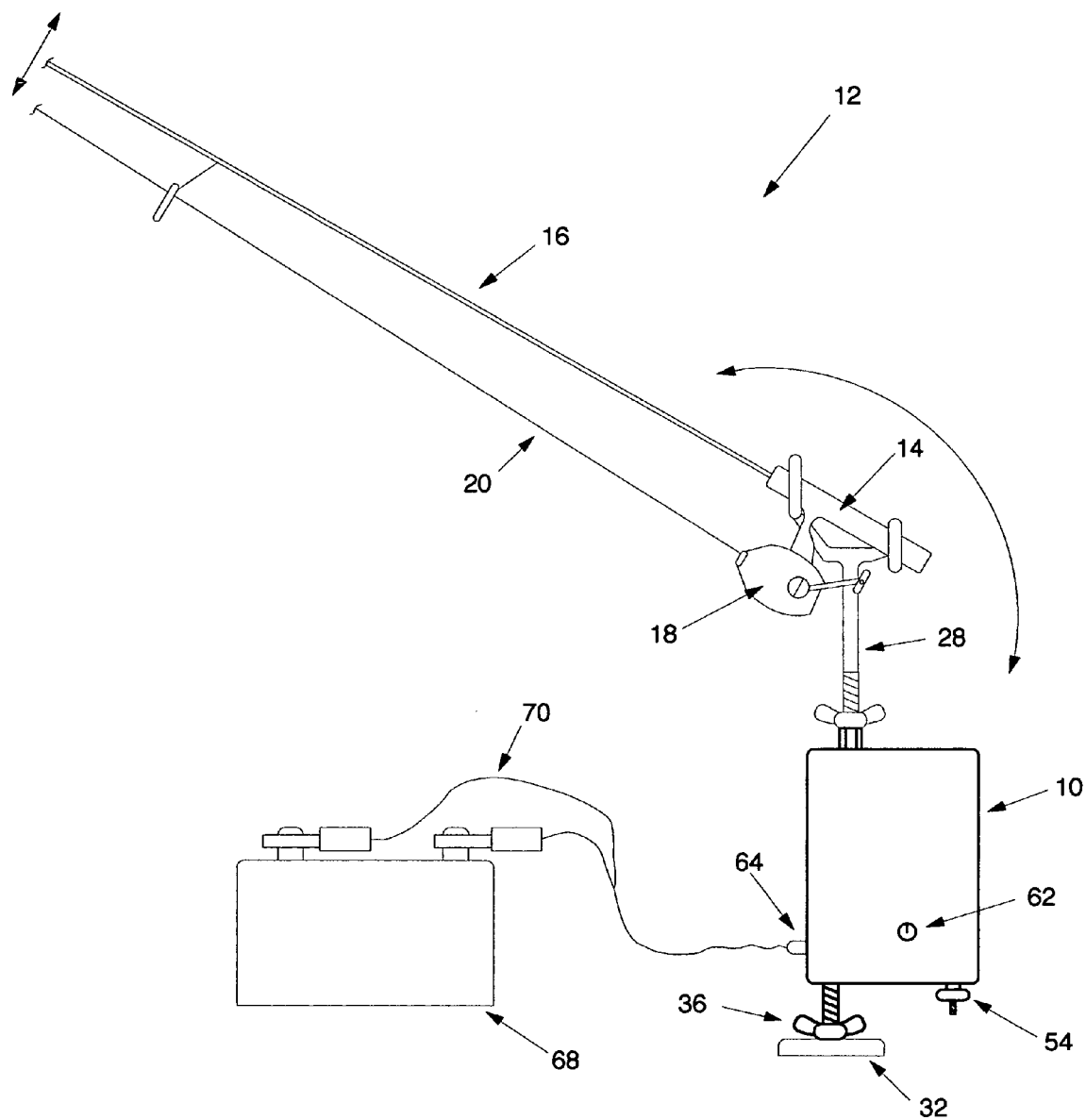
FIG. 1 is an elevation view of a jigging device constructed in accordance with a preferred embodiment of the present invention and shown holding a fishing pole.

Referring to FIG. 1, the preferred jigging device 10 constructed in accordance with a preferred embodiment of the present invention is illustrated supporting a fishing pole 12 and designed to impart action to a fishing lure (not shown) secured to the fishing pole 12. The fishing pole 12 is preferably conventional, and therefore preferably includes a handle 14 to be gripped by a user and a rod 16 extending from the handle 14. The handle 14 may include, or be covered by, a gripping element designed to aid the user in gripping the handle 14. For example, many conventional fishing poles include a rubber, sponge, or cork covered handles.

Since the handle 14 is typically designed to give the user positive control of the fishing pole 12 and the rod 16 is typically designed to flex, the rod 16 is typically much thinner than the handle 14. For example, the rod 16 is preferably less than one half inch in diameter. However, some heavy-duty fishing poles include relatively thick rods. Therefore, in some applications, the rod 16 may be greater than one half inch in diameter, but is preferably still thinner than the handle 14. The rod 16 is preferably flexible and may be constructed of any commonly used material, such as plastic, fiberglass, graphite, wood, cane, or other natural materials.

The fishing pole 12 may also include a reel 18. The reel 18 may be of any conventional type, such as a casting-type reel or a spinning-type reel. In this case, the lure is preferably secured to the fishing pole 12 with a line 20 controlled by the reel 18. Alternatively, especially where the fishing pole 12 does not include the reel 18, the line 18 may simply be secured to a distal end of the rod 16. In either case, the jigging device 10 imparts vibration to the rod 16, which in turn imparts action to the lure through the line 20.

Figure 2:
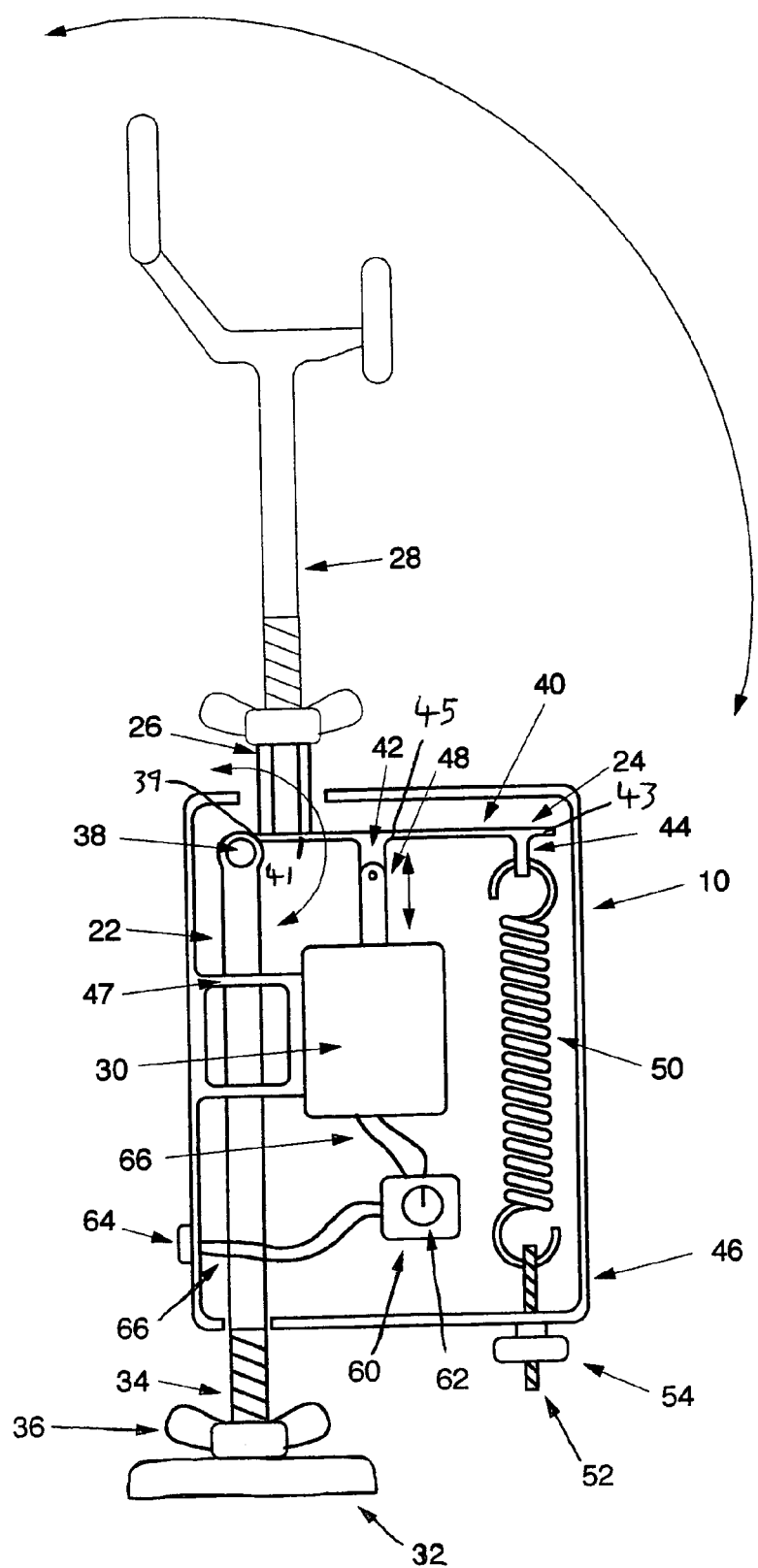
FIG. 2 is an elevation view of the device with a portion of a housing cut away to show certain internal components.

Referring also to FIG. 2 the jigging device 10 broadly comprises a frame 22, an arm 24 rotatably secured to the frame 22, a fishing pole holder receiver 26 rigidly secured to the arm 24 and designed to accept a fishing pole holder 28 to support the fishing pole 12, and an actuator 30 for selectively rotating the arm 24 with respect to the frame 22, thereby imparting action to the fishing pole 12 and the lure. The frame 22 is designed to be rigidly secured to a support 32, such as a rail of a boat or a pier. In the preferred embodiment, the frame 22 includes a cylindrical threaded end 34 that may be threaded into a fishing pole holder base, which is secured to or integral with the support 32. In this embodiment, the frame 22 may also include a wing nut 36 that may be threaded down against the support 32 to lock the threaded end 34 to the support 32.

The frame 22 is secured to the arm 24 through a pivot pin 38 or axle. The frame 22 preferably wraps around the pivot pin 38, which is preferably integral to the arm 24. However, the arm 24 may simply be secured to the pivot pin 38 or may even rotate about the pivot pin 38. A first end 39 of the arm 24 is pivotally attached to the frame 22 via a pivot pin 38, and the fishing pole holder receiver 26 is secured to a first segment 41 of the arm 24, wherein the first segment 41 is located between the first end 39 and a second end 43 of the arm 24. The actuator 30 is attached to a second segment 45 of the arm 24, wherein the second segment 45 is located between the first segment 41 and the second end 43 of the arm 24.

The arm 24 preferably includes a substantially horizontal member 40 and a first and second flange 42, 44, which preferably extend generally downwardly from the horizontal member 40. The fishing pole holder receiver 26 preferably extends generally upward from the horizontal member 40. The fishing pole holder receiver 26 is also preferably located between the pivot pin 38 and the first flange 42, thereby maximizing the actuator's 30 leverage, as will be discussed in further detail below.

The fishing pole holder receiver 26 may be secured to or formed integrally with the arm 24. As the fishing pole holder 28 is expected to present a threaded end, the fishing pole holder receiver 26 preferably presents a threaded hole into which the threaded end of the fishing pole holder 28 may be inserted in order to secure the fishing pole holder 28 to the fishing pole holder receiver 26. Alternatively, wherein the fishing pole holder 28 presents a smooth end, the fishing pole holder receiver 26 preferably presents a smooth bore hole into which the smooth end of the fishing pole holder 28 may be inserted. Finally, the arm 24 may simply include the fishing pole holder 28 extending therefrom.

The device 10 preferably includes a housing 46 to enclose and protect the arm 24 and the actuator 30. A majority of the frame 22 is preferably also enclosed within the housing 46. For example, in the preferred embodiment, only the threaded end 34 of the frame 22 extends from the housing 46. The fishing pole holder receiver 26 preferably extends through a hole in an upper portion of the housing 46. The housing 46 may include a removable cover in order to allow access to the device's 10 internal components.

The actuator 30 is preferably secured to the housing 46 by a stand off bracket 47. In the preferred embodiment, the actuator 30 is an electrical solenoid and includes a reciprocating rod 48 pivotally secured to the first flange 42 of the arm 24. As the reciprocating rod 48 reciprocates, the arm 24 is rotated about the pivot pin 38, thereby rocking the fishing pole holder receiver 26 and imparting action to the fishing pole 12 and the lure. As discussed above, in order to enhance the actuator's 30 torque, the first flange 42 is preferably located approximately midway along the horizontal member of the arm, with the fishing pole holder receiver 26 located nearer the pivot pin 38. In this manner, the actuator 30 may effectively impart action to large fishing poles.

Conversely, the device 10 may include a spring 50 to dampen the arm's 24 movement. Specifically, the spring 50 is preferably enclosed within the housing 46 and is preferably connected between the second flange 44 of the arm 24 and the housing 46. As the second flange 44 is preferably located opposite the pivot pin 38, the spring 50 may effectively resist the actuator 30. In this manner, the spring 50 is especially useful when the device 10 is used in conjunction with smaller fishing poles, so that the actuator 30 does not impart too much action to the lure. Thus, for use with large fishing poles, the spring 50 may be removed. When the device 10 is to be used with small fishing poles, the spring 50 may be reinstalled.

Alternatively, the spring 50 may be secured to the housing 46 through a threaded rod 52 so that the spring's 50 tension may be adjusted in order to compensate for different fishing poles. Specifically, the threaded rod 52 preferably extends through the housing 46 and a threaded thumb wheel 54 external to the housing 46. Turning the thumb wheel 54 clockwise pulls the threaded rod 52 further through the housing 46, thereby increasing the spring's 50 tension for use with smaller fishing poles. Conversely, turning the thumb wheel 54 counter-clockwise allows the spring 50 to pull the threaded rod 52 further into the housing 46, thereby deceasing the spring's 50 tension for use with larger fishing poles. In this manner, the device 10 may be infinitely adjustable for use with virtually any fishing pole. It should also be noted that the spring's 50 tension may be adjusted to account for any undesirable slack or play associated with the arm 24 or the actuator 30.

The device 10 also preferably includes a controller 60 having one or more controls 62 to control the actuator 30, and therethrough the lure, a power input 64 through which electrical power is accepted to power the controls 62 and the actuator 30, and wiring 66 to interconnect the actuator 30, the controls 62, and the power input 64. The controls 62 may include a power switch for selectively powering the actuator 30, an intensity control for selecting a desired magnitude or intensity of the action imparted to the lure, a delay control for selecting a delay period during which less or no action is imparted to the lure, and a duration control for selecting a duration during which significant action is imparted to the lure after the delay period has elapsed.

For example, the user may wish that the lure alternate between wiggling for two seconds and remaining substantially still for three seconds. In this case, the user manipulates the intensity control until he or she obtains the desired intensity of the lure's wiggling, the duration control until the lure wiggles for approximately two seconds between the delay periods, and the delay control until the lure remains substantially still for three seconds between the durations during which the lure wiggles.

Alternatively, the user may wish that the lure alternate between wiggling for one second and remaining substantially still for two seconds. In this case, the user manipulates the intensity control until he or she obtains the desired intensity of the lure's wiggling, the duration control until the lure wiggles for approximately one second between the delay periods, and the delay control until the lure remains substantially still for two seconds between the durations during which the lure wiggles.

In practice, it has been found that the duration control should allow the user to adjust the duration during which action is imparted to the lure to between one half second and five seconds. Similarly, it has been found that the delay control should allow the user to adjust the delay period during which little or no action is imparted to the lure to between one second and ten seconds. Of course, the controller 60 may not need to include all of the controls 62 discussed herein. For example, in a very basic embodiment, the controller 60 may have substantially pre-configured durations and delay periods. In this case, the user may only need to adjust the intensity control as desired.

The controls 62 may be simple switches, potentiometers, or other common electrical components. In complex embodiments, the controls 62 may interact with a computer processor in order to control the actuator 30, and therethrough the lure. Thus, the controller 60 allows the user to ensure that the lure realistically imitates live bait and/or other things that may induce a fish to strike.

The power input 64 preferably connects to a battery 68 or another similarly convenient power source. For example, the battery 68 may be a commonly available nine volt battery and may fit within the housing 46. Alternatively, or additionally, the power input 64 may include a connector which penetrates the housing 46. In this latter case, the battery 68 is preferably a marine battery, such as those commonly used in fishing boats, and connects to the controller 60 through a battery cable 70. Where the power input 64 allows connection of both internal and external batteries, the power switch preferably allows the user to select between the internal and external batteries.

It can be seen that the device 10 does not capture the fishing pole 12, and therefore does not interfere with normal operation of the fishing pole 12. Rather the device 10 supports the fishing pole 12 in the fishing pole holder 28, which is preferably conventional and does not interfere with the fishing pole 12. This feature is especially advantageous when a fish strikes the lure and a fisherman needs to set his or her hook quickly without interference.

While the present invention has been described above, it is understood that substitutions may be made. For example, the spring 50 may be secured to the frame 22, rather than the housing 46. Similarly, the actuator 30 may also be secured to the frame 22, rather than the housing 46. Furthermore, it should be noted that there are many types of fishing pole holders. Therefore, the fishing pole holder receiver 26 may be designed to accept any or all of these types. Furthermore, the frame 22 may be designed to mate with any or all types of conventional fishing pole holder receivers. These and other minor modifications are within the scope of the present invention.

In use, a user first secures the frame 22 to the support 32 and the fishing pole holder 28 to the fishing pole holder receiver 26. The user then connects the power input 64 to the power source. The user then casts the lure as he or she normally would and places the fishing pole 12 into the fishing pole holder 28. Using the controls 62, the user configures the controller 60 as desired. When a fish strikes, the user may simply snatch the fishing pole 12 from the fishing pole holder 28, thereby setting his or her hook in one swift motion.

Having thus described a preferred embodiment of the invention, what is claimed as new and desired to be protected by Letters Patent includes the following:

1. A jigging device for imparting action to a fishing lure secured to a fishing pole having a handle and a rod extending from the handle, the device comprising:
   a frame rigidly secured to an external support;
   an arm with a first end pivotally secured to the frame, wherein the arm includes a substantially horizontal member and a flange extending substantially downwardly from the horizontal member;
   a fishing pole holder receiver extending substantially upwardly from the horizontal member of the arm and operable to support the fishing pole; and
   a reciprocating actuator for selectively pivoting the arm about the first end with respect to the frame, thereby causing the receiver to reciprocate along a curved path about the first end of the arm, wherein the actuator is attached to the flange.

2. The device as set forth in claim 1, wherein the frame is rigidly secured to the external support selected from the group consisting of a boat, a rail, and a pier, thereby attaching the device to the support.

3. The device as set forth in claim 1, further including a housing operable to enclose and protect the arm and the actuator.

4. The device as set forth in claim 1, further including a spring to resist the actuator.

5. The device as set forth in claim 4, wherein the spring's tension is adjustable in order to compensate for different fishing poles.

6. The device as set forth in claim 4, wherein the spring is connected to the arm opposite the arm's axis of rotation, thereby magnifying the spring's resistance to the actuator.

7. The device as set forth in claim 1, wherein the actuator is an electrical solenoid.

8. The device as set forth in claim 7, further including a controller operable to control electrical power to the solenoid.

9. The device as set forth in claim 8, wherein the controller is further operable to control a rate at which the solenoid reciprocates, thereby controlling an intensity of the action imparted to the fishing pole.

10. The device as set forth in claim 8, wherein the controller is further operable to control a delay period during which substantially no action is imparted to the fishing pole and a duration control for selecting a duration which action is imparted to the fishing pole after the delay period has elapsed.

11. A jigging device for imparting action to a fishing lure secured to a fishing pole having a handle and a rod extending from the handle, the device comprising:
   a frame rigidly secured to an external support;
   an arm with a first end pivotally secured to the frame, wherein the arm includes a substantially horizontal member, a first flange extending substantially downwardly from the horizontal member, and a second flange extending substantially downwardly from the horizontal member;
   a fishing pole holder receiver rigidly secured to the arm and operable to accept a fishing pole holder in order to support the fishing pole by the handle, wherein the receiver extends substantially upward from the horizontal member of the arm;
   a reciprocating actuator connected to the first flange for selectively pivoting the arm about the first end with respect to the frame, thereby imparting action to the fishing pole; and
   a spring to resist rotational movement of the arm imparted by the actuator, wherein the spring is connected to the second flange and the spring's tension is adjustable.

12. The device as set forth in claim 11, wherein the frame is selectively rigidly secured to the external support selected from the group consisting of a boat, a rail, and a pier, thereby attaching the device to the support.

13. The device as set forth in claim 11, further including a housing operable to enclose and protect the arm, the actuator, and the spring.

14. The device as set forth in claim 13, wherein the spring is secured to the housing with a threaded rod which may be positioned relative to the housing to adjust the spring's tension in order to compensate for different fishing poles.

15. The device as set forth in claim 11, wherein the spring is connected to the arm opposite the arm's axis of rotation, thereby magnifying the spring's resistance to the actuator.

16. The device as set forth in claim 11, wherein the actuator is an electrical solenoid.

17. The device as set forth in claim 16, further including a controller operable to control electrical power to the solenoid.

18. The device as set forth in claim 17, wherein the controller is further operable to control a rate at which the solenoid reciprocates, thereby controlling an intensity of the action imparted to the fishing pole.

19. The device as set forth in claim 17, wherein the controller is further operable to control a delay period during which substantially no action is imparted to the fishing pole and a duration control for selecting a duration during which action is imparted to the fishing pole after the delay period has elapsed.

20. A jigging device for imparting action to a fishing lure secured to a fishing pole having a handle and a rod extending from the handle, the device comprising:
   a frame rigidly secured to an external support;
   an arm with a first end pivotally secured to the frame such that an axis of rotation of the arm passes through the first end and is substantially normal to a longitudinal axis of the arm, wherein the arm includes a substantially horizontal member, a first flange extending substantially downwardly from the horizontal member, and a second flange extending substantially downwardly from the horizontal member, wherein the first flange is between the first end and the second flange;
   a fishing pole holder receiver rigidly secured to the arm and operable to support the fishing pole, wherein the receiver extends substantially upwardly from the horizontal member at a point between the first flange and the first end of the arm;
   an electrical solenoid for selectively rotating the arm with respect to the frame, thereby imparting action to the fishing pole, wherein the solenoid is connected to the first flange;
   a housing operable to enclose and protect the arm and the solenoid;
   a spring to resist the solenoid, wherein the spring is connected to the second flange, the spring's tension is adjustable in order to compensate for different fishing poles, and the spring extends along an axis that is substantially parallel with the frame, thereby magnifying the spring's resistance to the solenoid; and
   a controller operable to control electrical power to the solenoid, control a rate at which the solenoid reciprocates, thereby controlling an intensity of the action imparted to the fishing pole, and control a delay period during which substantially no action is imparted to the fishing pole and a duration control for selecting a duration during which action is imparted to the fishing pole after the delay period has elapsed.

* * * * *